United States Patent
Bagley

(10) Patent No.: US 10,321,673 B1
(45) Date of Patent: Jun. 18, 2019

(54) BIRD DETERRENT DEVICE

(71) Applicant: Norman J. Bagley, North Andover, MA (US)

(72) Inventor: Norman J. Bagley, North Andover, MA (US)

( * ) Notice: Subject to any disclaimer, the term of this patent is extended or adjusted under 35 U.S.C. 154(b) by 471 days.

(21) Appl. No.: 15/284,938

(22) Filed: Oct. 4, 2016

Related U.S. Application Data

(60) Provisional application No. 62/238,846, filed on Oct. 8, 2015.

(51) Int. Cl.
 *A01M 29/32* (2011.01)
 *B63B 17/00* (2006.01)
 *A01M 29/16* (2011.01)

(52) U.S. Cl.
 CPC ............ *A01M 29/32* (2013.01); *A01M 29/16* (2013.01); *B63B 17/00* (2013.01)

(58) Field of Classification Search
 CPC .......... B63B 8/00; B63B 17/00; B63B 17/02; B63B 59/00; A01M 29/00; A01M 29/32
 USPC .................................... 114/343, 364; 52/101
 See application file for complete search history.

(56) References Cited

U.S. PATENT DOCUMENTS

| | | | | |
|---|---|---|---|---|
| 4,100,706 A | * | 7/1978 | White | A01M 29/32 52/101 |
| 5,410,982 A | * | 5/1995 | Mann | B63B 17/02 114/343 |
| 5,476,062 A | * | 12/1995 | Ondris | B63B 17/02 114/343 |
| 6,082,285 A | * | 7/2000 | Hinrichs | B63B 17/02 114/343 |

OTHER PUBLICATIONS

Boatus Seaworthy Publication/Magazine. Online Archive. Original publication sometime in 2002. Can be accessed at http://www.boatus.com/seaworthy/birds/default.asp Descriptions of various bird deterrents for boats. The 3rd description, at the bottom of p. 3 / top of p. 4 describes use of a net with clothespins. However it does not describe the use of an integrated mounting system with flexible cordage and connectors, as in the Bagley U.S. Appl. No. 15/284,938.

* cited by examiner

*Primary Examiner* — Lars A Olson

(57) ABSTRACT

A bird deterrent device for preventing a bird from landing on an area to be protected such as, but not limited to, a marine vessel or boat. The bird deterrent device is easy to install and remove, does not require any new permanent mounting hardware to be installed, and easily adapts to the unique contours, structure, and components of the marine vessel or boat. The device includes a mesh net, integrated flexible cordage, and fasteners.

16 Claims, 7 Drawing Sheets

BIRD DETERRENT DEVICE

This is a nonprovisional patent application claiming priority of U.S. Provisional Application for Patent No. 62/238,846 filed on Oct. 8, 2015, the complete subject matter of which is incorporated herein by reference in its entirety.

BACKGROUND OF THE INVENTION

1. Field of the Invention

The invention pertains generally to the field of bird deterrent systems and more particularly to devices for preventing birds from landing on a structure such as a marine vessel or boat, and not limited to a sailboat.

2. Description of the Related Art

Birds frequently land on marine vessels and boats, and foul them with excrement, feathers, vomit, and other remnants of their presence. Cleaning up after birds is a time consuming and frustrating experience for boat owners. In the best case, this is an major inconvenience. In the worst case, the fouling can be a health hazard, cause slip and fall injuries, and require the use of chemical cleaners which can end up in waterways.

The related art has disclosed various devices for deterring birds from landing. U.S. Pat. No. 6,082,285 entitled 'Sea Bird Marine Craft Protector' discloses a net-like device that covers a boat to prevent sea birds from landing on the boat. The device is custom sized to the boat that it is designed to protect and requires a plurality of support rods to hold the net above the surface of the boat. The device may also contain a reel for letting out and winding up the protector net, and may also require the addition of support rods to hold the netting above the boat's structure.

U.S. Pat. No. 7,500,451 entitled 'Bird Deterrent Apparatus' discloses a bird deterrent apparatus comprising a barrier line for preventing birds from landing near a location to be protected from said birds, a line retractor having a line spool for storing and delivering said barrier line, a line retractor spring for tensioning and retracting said barrier line, and a rail clamp attached to said line retractor for mounting and demounting said line retractor on a structural element.

U.S. Pat. No. 5,476,062 (Ondris et. al.) describes a device intended to prevent birds from flying near and landing on a boat, having a post centrally mounted on the boat with a top end position above the highest point of the boat. A series of cables extends between the top end of the post and peripheral points on the boat. The cables can be detached and the post can be retracted during use of the boat. The cables interrupt the flight paths of the birds and prevent them from landing or flying near the boat.

U.S. Pat. No. 5,410,982 (Mann) describes an open net cover extendable over the deck of a swimming and diving raft to discourage and prevent waterfowl from alighting on the raft and befouling the deck. The net is temporarily attachable about the periphery of the raft and has an open multi-polygonal pattern that permits a swimmer to walk about the raft and thereby easily install or release the net.

U.S. Pat. No. 4,100,706 (White) describes a system covering an area of ground for adverse conditioning webfooted aquatic birds against roosting in the area comprising an array of elongated members each sufficiently thin that a web-footed aquatic bird cannot roost upon an individual member and each sufficiently spaced in substantially horizontal planes from adjacent elongated members that a web-footed aquatic bird cannot roost simultaneously upon a plurality of the members, the array being sufficiently closely spaced to the ground at the aforementioned area to prevent the birds from alighting directly into the area.

Many devices have been devised to deter birds from fouling marine vessels and boats. These include, but are not limited to: Fake predator animals, such as owls and snakes, to scare birds away;

Electronic audio generating devices to scare birds away;

Elongated wires attached to bases, that are mounted in areas to be protected, and move in the wind in order to aggravate birds causing them to fly away;

Horizontal rods attached to vertical poles, which rotate in the wind and strike birds causing them to fly away;

Customized netting and framing installed on power boats to prevent birds from landing;

Electrical current carrying wire devices that shock birds that come in contact with the device;

Wires and lines attached to permanently mounted vertical poles above specific areas to prevent birds from landing; and Retractable wires and lines that are temporarily installed above specific areas to prevent birds from landing.

Each of the aforementioned existing devices have practical drawbacks. Some existing devices, such as fake predators, are not effective. Some existing devices may be effective, but are costly and require significant customization to the marine vessel or boat. Some devices may protect specific areas but are impractical to use to cover all areas. Some devices are impractical to use on a sailboat due to the various structures and operational components, such as masts, booms, lifelines, standing rigging, running rigging, and the like.

A solution to the bird fouling problem is needed which is effective in preventing bird fouling, is easy to install and remove, is relatively inexpensive, will work for sailboats which have various structures and components needed for their operation, will protect the majority of the boat area on which birds are likely to land, will work for a variety of specific models of boats without significant customization, can be stowed when not in use, and will withstand the outdoor environment.

SUMMARY OF THE INVENTION

Accordingly, it is therefore an object of this invention to provide a bird deterrent device comprising a mesh net with integrated flexible cordage and fastening devices that is effective in preventing bird fouling and meets the criteria described in the Background.

When in use, the deterrent device is mounted to the existing structural components of the protected marine vessel or boat via the flexible cordage and fastening devices, in order to cover and protect the areas of the vessel or boat that birds could land on. The mesh net is suspended above the boat deck and surfaces such that a bird attempting to land will be blocked by the net from reaching the boat deck or other boat surfaces to land on. The mesh dimensions of the netting are such that a bird cannot fit though the mesh. The integrated flexible cordage which the net is suspended from is flexible enough such that a bird attempting to land directly on the cordage would not find a stable landing point. Wind impacting on the mesh net additionally tends to make audible sound, which may also act to deter birds.

The deterrent device can be installed and removed from the vessel, and stowed, in a matter of minutes. This feature is important particularly to recreational boaters whose time is often limited.

The deterrent device is flexible in size and shape such that it can be used on a variety of different marine vessel or boat models within a given size range. This eliminates the need for a completely custom, boat specific solution which would be more costly and time consuming to provide.

BRIEF DESCRIPTION OF THE DRAWINGS

This invention will be pointed out with particularity in claims appended to this application. The above and further advantages of this invention may be better understood by referring to the following description taken in conjunction with the accompanying drawings, in which:

DESCRIPTION OF THE PREFERRED EMBODIMENTS

The preferred embodiments of the present invention are described with reference to FIGS. 1-10 of the drawings. Identical elements in the various figures are identified with the same reference numbers.

Figure 1:
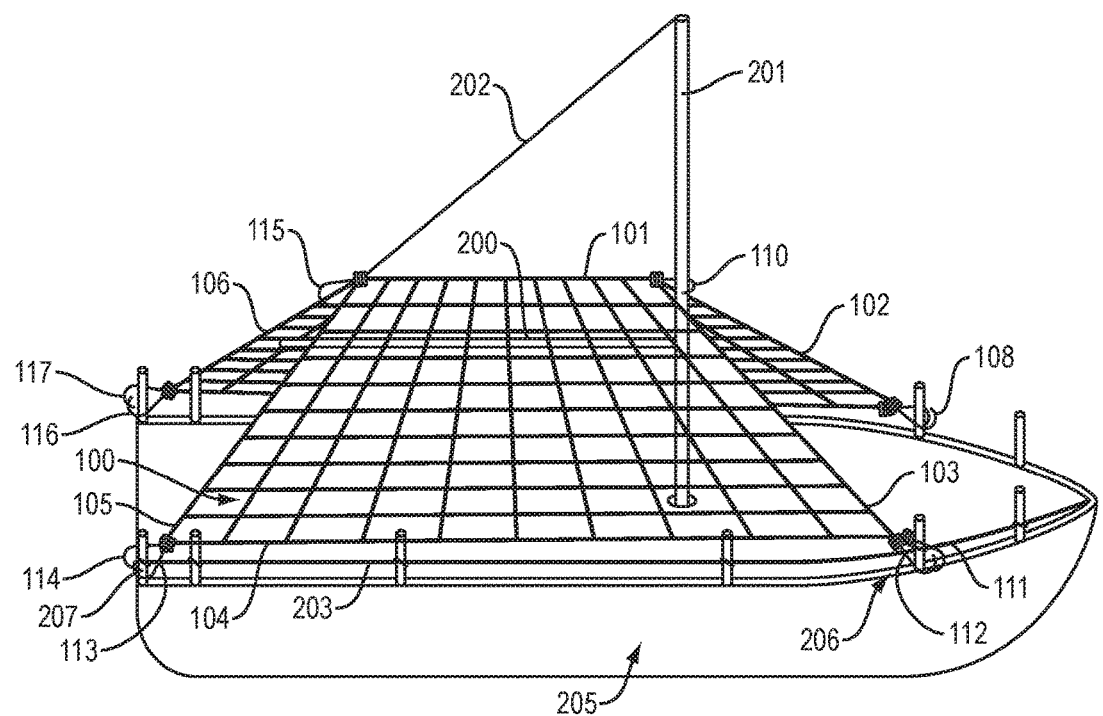
FIG. 1 is a perspective view of a bird deterrent device constructed in accordance with the present invention, installed on a marine vessel.

Referring to FIG. 1, a perspective view from the starboard (right) side of a sailboat according to one embodiment of the invention is shown. The mesh net 100 is shown suspended over a boat deck by the integrated flexible cordage 101. The integrated flexible cordage 101 in this embodiment is a type of cordage commonly known as 'shock cord' or 'bungee cord', which often has a stretch ratio of 100% and is further described below. The flexible cordage 101 may be coded using a unique color, number, or other marking to indicate the installation location on the boat, for example, over the boom in this case. A fastening device 110, further described below, is attached to the end of the flexible cordage. The integrated flexible cordage 101 is attached to the boat's mast 201 by looping the end of the cordage around the mast and connecting the fastening device 110 back onto the cordage 101. Alternatively, the fastening device 110 may be connected directly to the mast 201 if a suitable connection point is available directly on the mast. The integrated flexible cordage 101 is connected to the boat's 'topping lift' 202 using the fastening device 115. The topping lift 202 is a line that runs from the top of the boat's mast 201 to the end of the boat's boom 200 and is used to elevate the boom when the main sail is not raised. As such the topping lift is normally a standard part of the boat's equipment and provides a convenient attachment point for the fastening device 115. Alternatively, the fastening device 115 may be attached further aft (to the rear) of the boat on a 'back-stay'. A back-stay is part of the boat's standard standing rigging and runs from near the top of the mast 201 to a stationary point on the rear of the boat's hull 205. Alternatively, for boats that may have neither a topping-lift nor a back-stay, the fastening device 115 may be attached directly to the back of the boom 200. The fastening devices 110 and 115 may be coded using a unique color, number, or other marking to indicate the installation location on the boat, for example, over the boom at the mast for 110 and over the boom at the rear end of the boom for 115.

Again referring to FIG. 1, the integrated flexible cordage at the front edge of the mesh net 100 is used to suspend the front edge of the mesh net over the forward part of the boat's deck and provide tension in the mesh net. The mid-point of this piece of cordage runs from the aft (rear) edge of the mast 201 near the connection point of the fastening device 110. The right section 103 of this cordage runs out to the starboard (right) side of the boat and connects using the fastener 112 to an available connection point on the boat. The connection point may typically be a 'stanchion' 206, near the forward part of the boat, which is a vertical post used for holding a 'life-line' 203. A 'life-line' is a line made of wire or other material used as a safety mechanism to prevent people from falling overboard. Both the stanchions and lifelines are typically standard equipment on the boat, normally run for the entire horizontal length of the boat, and may be used as mounting points for the present invention via the fastening device as shown at 112. The port (left) side section 102 of the cordage at the front of the mesh net similarly runs out to a connection point on the port side of the boat and connects using fastener 108. The sections of cordage 102 and 103 will typically need to run around and/or behind components of the boat's rigging such as, but not limited to, side stays, halyards and blocks. The flexible cordage 102 and 103, and/or the fasteners 112 and 108 may be coded using a unique color, number, or other marking to indicate the installation location on the boat.

Again referring to FIG. 1, the integrated flexible cordage at the rear edge of the mesh net 100 is used to suspend the rear edge of the mesh net over the aft part of the boat's deck and cockpit and provide tension in the mesh net. The mid-point of this piece of cordage runs from the forward (front) edge of the topping lift 202 near the connection point of the fastening device 115. The starboard (right) section 105 of this cordage runs out to the starboard side of the boat and connects using the fastener 113 to an available connection point on the boat. The connection point may typically be a stanchion 207, near the aft (rear) part of the boat, or may be the base of a rear seat, the mounting point of a back-stay, a cleat, or any other convenient point on the boat. The port side (left) section of this cordage would run out to a similar point on the port side of the boat. The starboard side flexible cordage 105 and/or the fastener 113, and the port side of this cordage and its corresponding fastener may be coded using a unique color, number, or other marking to indicate the installation location on the boat.

Again referring to FIG. 1, the integrated flexible cordage 104 at the starboard (right) edge of the mesh net 100 is used to hold the net on the starboard side of the boat. The fastening device 114 connects this cordage section to the boat at a convenient attachment point near the aft (rear) starboard (right) of the boat such as a stanchion 207, backstay, rear seat frame, cleat, or similar. The fastening device 111 similarly connects this cordage section to a convenient mounting point on the starboard (right) forward (front) of the boat, such as stanchion 206. Tension in the integrated flexible cordage provides tension in the mesh net and keeps the mesh net over the right side extremity of the boat. Similarly, the integrated flexible cordage at the port (left) edge of the mesh net is used to hold the net on the port side of the vessel. The flexible cordage 104 and/or the fasteners 114 and 111, and the similar port side cordage and/or it's corresponding fasteners may be coded using a unique color, number, or other marking to indicate the installation location on the boat.

Figure 2:
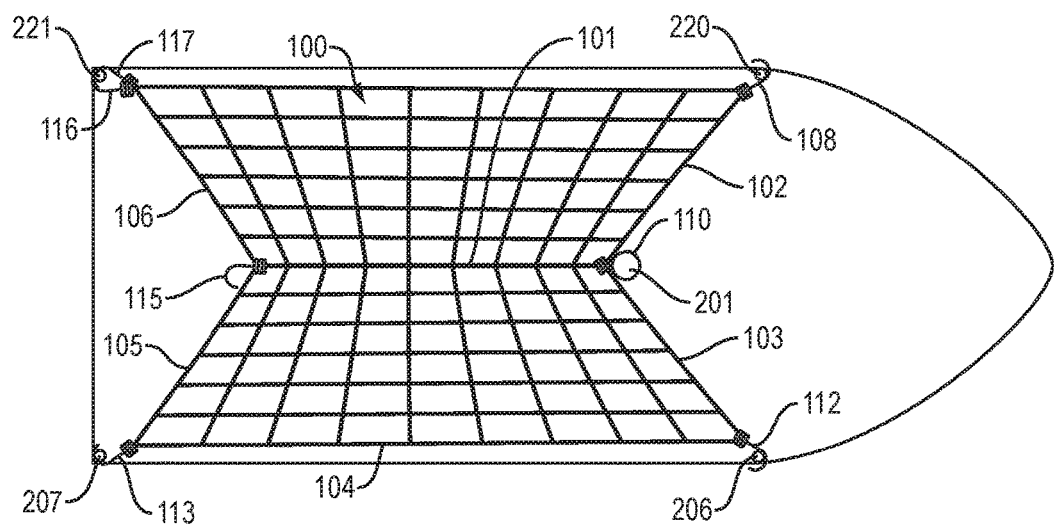
FIG. 2 is a top view of the bird deterrent device of the present invention shown in FIG. 1, installed on the marine vessel.

Referring to FIG. 2, a top view of the present invention, installed on the boat, is shown. As in FIG. 1, the mesh net 100 is suspended over the boat deck and boom using the integrated flexible cordage 101 which is connected to the mast 201 and topping lift using fasteners 110 and 115; using the integrated flexible cordage 105 and 106 which is connected to stanchions 207 and 221 using fasteners 113 and 117; and using integrated flexible cordage 102 and 103 which are connected to stanchions 206 and 220 using fasteners 108 and 112.

Figure 3:
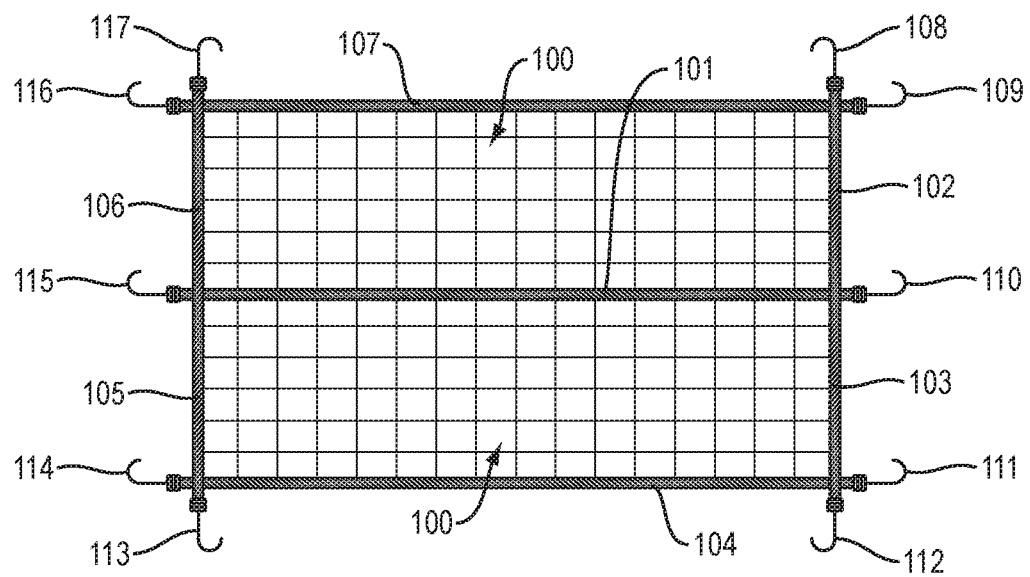
FIG. 3 is a top view of the bird deterrent device of the present invention shown in FIG. 1, laid flat on a flat surface and not installed on the marine vessel, with a rectangular shape embodiment.
Figure 5:
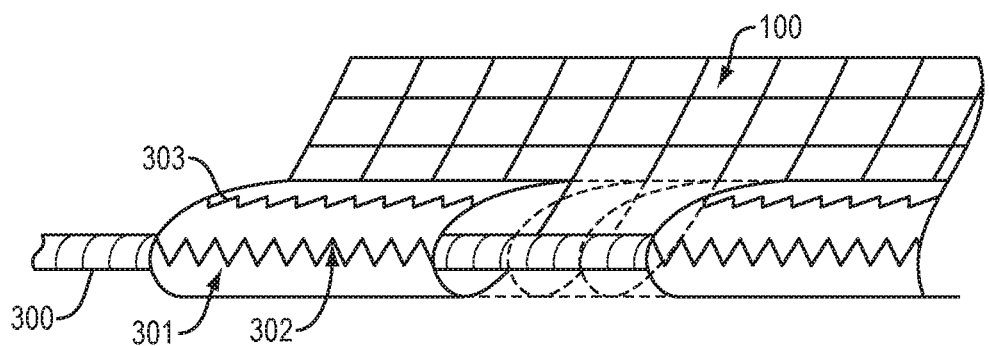
FIG. 5 is an exploded view of the mesh net and integrated flexible cordage with the integrated flexible cordage assembled to the mesh net with a textile or plastic strip.

Referring to FIG. 3, a top view of the bird deterrent device of the present invention shown in FIG. 1 and FIG. 2, when not installed on the boat and laid flat on a flat surface, is shown for reference. In this embodiment, the mesh net 100 is cut in a rectangular shape, with integrated flexible cordage sections 102, 103, 104, 105, 106, 107 along the 4 edges, and integrated flexible cordage 101 bisecting the mesh net at the midpoint of the smaller edges. 102 and 103 are typically the same physical piece of cordage and are shown as two separate sections only for illustrative purposes. Similar for 105 and 106. A total of 10 fasteners 108 through 117 are installed at the ends of the integrated flexible cordage. In this embodiment, the lengths of 101, 104, and 107 are approximately equal. When installed on the boat as shown in FIGS. 1 and 2, the distance between fasteners 110 and 115 will typically be less than the distance between fasteners 109 and 116 and less than the distance between fasteners 111 and 114. Hence, the distance spanned by the section of mesh net 100 and integrated flexible cordage 101 between fasteners 110 and 115 will typically be less than the distance spanned by the section of mesh net and integrated flexible cordage 104 between fasteners 111 and 114. The flexibility in the integrated flexible cordage allows the distance spans to be different for the different actual required spans on the boat. In addition, the method of assembly of the integrated flexible cordage 101 to the mesh net 100 in this embodiment, as shown in FIG. 5, allows the mesh net to be compressed, or 'bunched up' along the shorter span of 101, thus providing for the embodiment of the present invention to be adapted easily to the requirements of the specific boat on which it is installed.

Again referring to FIG. 3, and as mentioned previously, the cordage may be color coded or otherwise marked to indicate location on the boat. For example, cordage 101 could be constructed using white with a blue stripe, cordage 102 and 103 could be constructed using white with a yellow stripe, cordage 104 could be constructed using white with a red stripe, cordage 107 could be constructed using white with a green stripe, and cordage 105 and 106 could be constructed using white with a black stripe. Alternatively, or in addition, the fasteners 108 through 117 can be either fabricated in different colors, or colored labels can be applied to them. For example, fasteners 109 and 116 green, fasteners 111 and 114 red, fasteners 108 and 112 yellow, fasteners 113 and 117 black, and fasteners 110 and 115 blue. Identifying the cordage sections and/or the fasteners enables the user of the bird deterrent device to easily determine the boat installation location of each section of the device.

Figure 4:
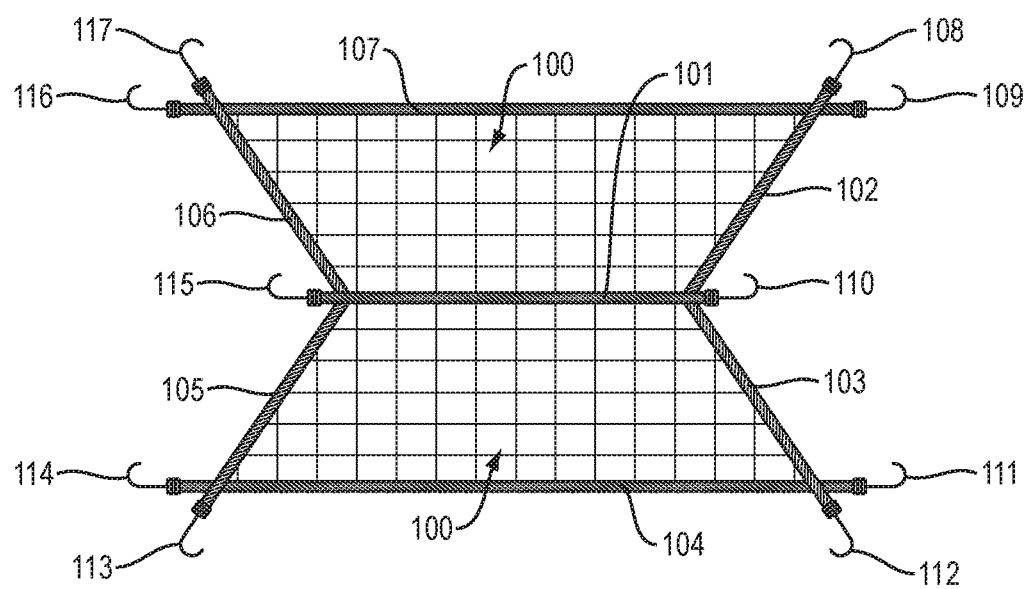
FIG. 4 is a top view of the bird deterrent device of the present invention shown in FIG. 1, laid flat on a flat surface and not installed on the marine vessel, with a non-rectangular shape embodiment.

Referring to FIG. 4, a top view of an alternate embodiment of the bird deterrent device of the present invention shown in FIG. 1 and FIG. 2, is laid flat on a flat surface and not installed on the marine vessel or boat, is shown. In this alternative embodiment, the mesh net 100 is cut in a shape that more closely approximates the distance spans required for installation on a range of boats. In particular, for the example shown in FIG. 4, the length of the span along flexible cordage 101 is less than the length of the spans along flexible cordage sections 104 and 107. In other respects the discussion above referring to FIG. 3 holds for FIG. 4, in particular the ability to install the present invention on boats with varying span requirements.

Figure 4A:
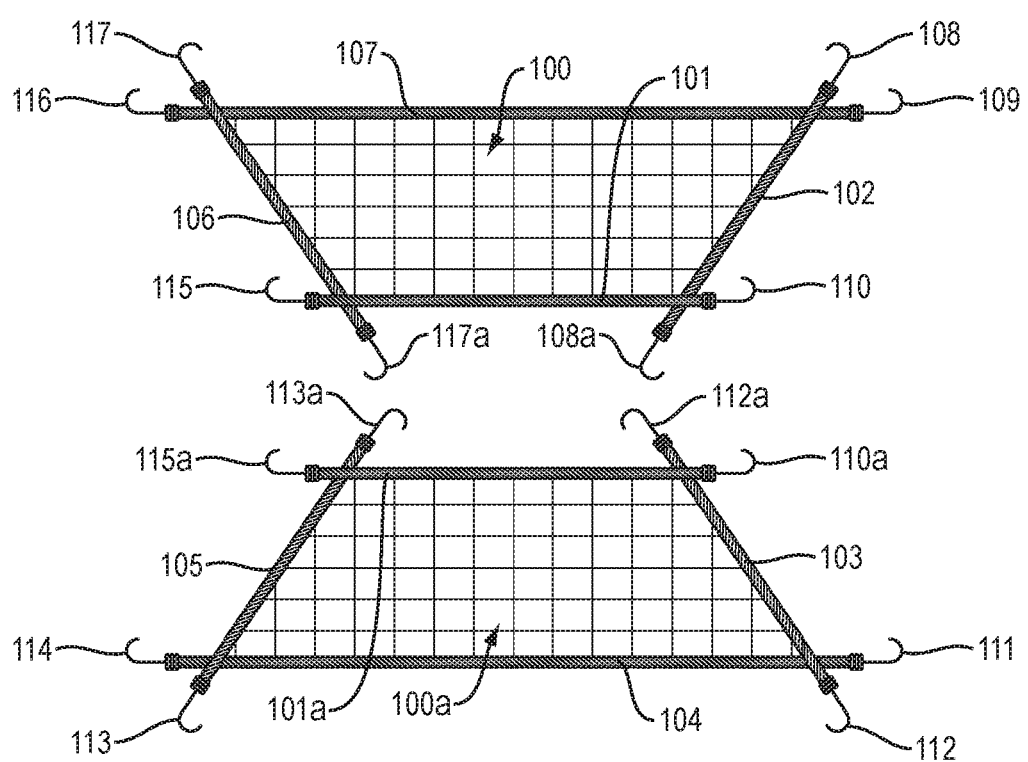
FIG. 4A is a top view of an alternate embodiment of the bird deterrent device of the present invention shown in FIG. 1, laid flat on a flat surface and not installed on a marine vessel, wherein the embodiment comprises two separate sections of mesh nets.

Referring to FIG. 4A, a top view is shown of an alternate embodiment of the bird deterrent device of the present invention shown in FIG. 1 and FIG. 2, which is laid flat on a flat surface and not installed on the marine vessel or boat. In this alternative embodiment, the mesh net is cut into two sections 100 and 101a and the flexible cordage and connectors are integrated only along the perimeter of the two sections. This embodiment enables the invention to be installed when existing elements of the structure to be protected interfere with installation of the previously described embodiments. In particular, for sailboats that have 'Lazy Jack' systems installed, one section of the invention can be installed on the port (left) side of the boat, and the other section can be installed on the starboard (right) side of the boat. 'Lazy Jack' systems typically consist of rigging lines that extend from the top of the mast down to the boom in order to assist with sail handling during reefing and furling. In other respects the discussion above referring to FIG. 3 and FIG. 4 holds for FIG. 4A, in particular, the ability to install the present invention on boats with varying span requirements.

Figure 4B:
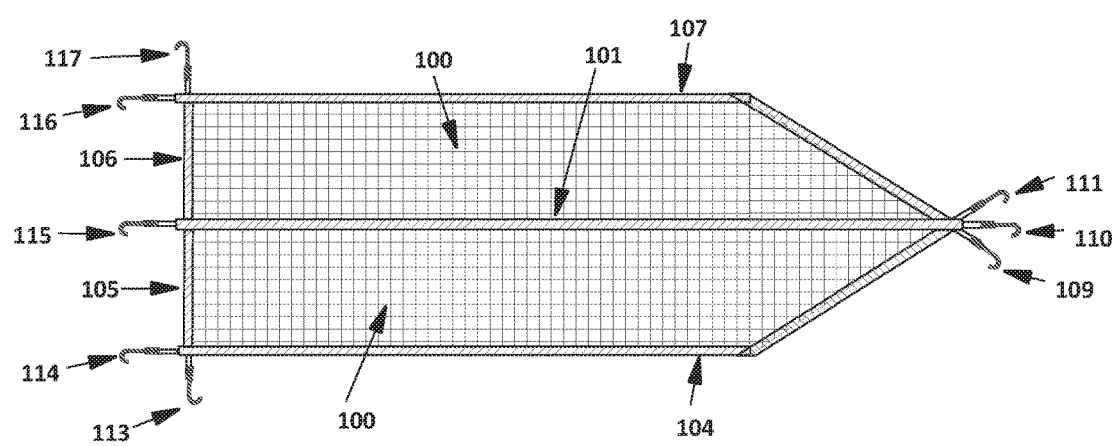
FIG. 4B is a top view of an alternate embodiment of the bird deterrent device of the present invention shown in FIG. 1, laid flat on a flat surface and not installed on a marine vessel, with a non-rectangular shape embodiment.

Referring to FIG. 4B, a top view is shown of an alternate embodiment of the bird deterrent device of the present invention show in FIG. 1 and FIG. 2, which is laid flat on a flat surface and not installed on the marine vessel or boat is shown. In this alternative embodiment the mesh net 100 is cut in a shape that more closely approximates the distance spans required for installation on a range of boats. In particular, for the example shown in FIG. 4B, the outer edges are angled to meet at a common point at the forward side of the device. The flexible cordage sections 101, 104 and 107 meet at this common point. In other respects the discussion above referring to FIG. 3 and FIG. 4 holds for FIG. 4B, in particular the ability to install the present invention on boats with varying span requirements. It is to be understood that this embodiment and the previous embodiments are example embodiments and that other shapes are contemplated and are within the scope of the present invention.

Referring to FIG. 5, an exploded view of the mesh net 100 assembled with the integrated flexible cordage using a textile or plastic strip 301 is shown. In this embodiment, the mesh net 100 is connected to a textile or plastic strip 301 by sewing the mesh net 100 to the textile or plastic strip 301. The textile or plastic strip 301 used in this embodiment could be any material such as, but not limited to, canvas, polyester, nylon, or other plastic, that is determined suitable for use in the present invention. Typically, the textile strip would be a commonly known and used textile material known in the textile industry as 'bias binding' or 'bias tape'. Similarly, the mesh net 100 could be composed of any material such as, but not limited to, polypropylene, rope, filament line, or other plastic, that is determined suitable for use in the present invention. In FIG. 5 the attachment of the mesh net 100 to the textile or plastic strip 301 is shown as a zigzag pattern stitch 302. The textile or plastic strip 301 with mesh net 100 attached is then folded around the flexible cordage 300 and sewed to itself using a straight stitch 303. In this example embodiment, the integrated flexible cordage 300 would be able to slip through the textile or plastic strip, or conversely, the mesh net 100 attached to the textile or plastic strip 301 is able to move relative to the integrated flexible cordage, which allows the invention to be adjusted to the span lengths required for the specific vessel it is being installed on, as described above with reference to FIG. 3 and FIG. 4. The mesh net 100 may alternatively be attached to the textile or plastic strip 301 and integrated flexible cordage 300 in a single step by sewing only the stitch shown as 303, and not sewing the stitch 302. Other specific methods of attaching the mesh net 100 to the textile or plastic strip 301, such as, but not limited to, gluing, fusing via melting, stapling, tacking using metal fasteners are anticipated and may be utilized.

Figure 6:
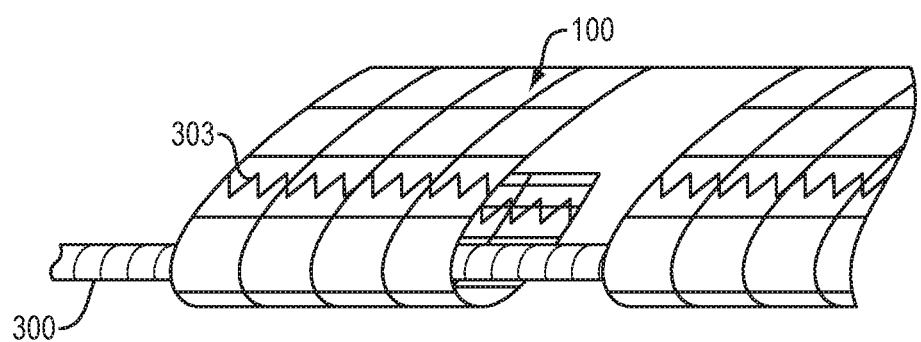
FIG. 6 is an exploded view of a portion of the mesh net and integrated flexible cordage with the integrated flexible cordage assembled directly in the mesh net without the use of the textile or fabric strip.

Referring to FIG. 6, an exploded view of the mesh net 100 assembled with the integrated flexible cordage 300 is shown. In this embodiment, the mesh net 100 is folded around the flexible cordage 300 and connected to itself by sewing. As described above, the mesh net 100 could be composed of any material such as, but not limited to, polypropylene, rope, filament line, or other plastic, that is determined suitable for use in the present invention. In FIG. 6 the attachment of the mesh net 100 to itself via sewing is shown as a zigzag pattern stitch 303. As with the above discussion in reference to FIG. 5, in this example embodiment, the integrated flexible cordage 300 would be able to slip through the space formed by folding the mesh net over the cordage, or conversely, the mesh net 100 is able to move relative to the integrated flexible cordage 300, which allows the invention to be adjusted to the span lengths required for the specific vessel it is being installed on, as described above with reference to FIG. 3 and FIG. 4. Other specific methods of attaching the mesh net 100 to itself, such as, but not limited to, gluing, fusing via melting, stapling, tacking using metal fasteners are anticipated and may be utilized.

Figure 7:
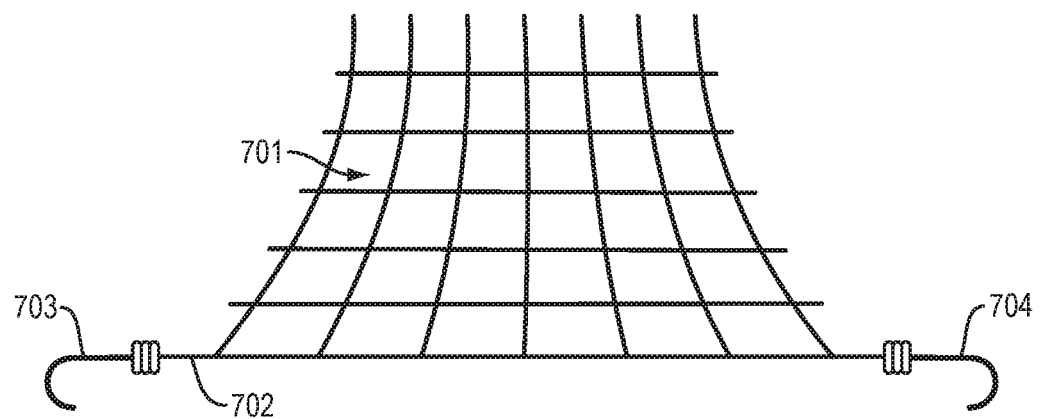
FIG. 7 is a perspective view of a portion of the mesh net, integrated flexible cordage, and fastening devices wherein the mesh netting is flexible and the integrated flexible cordage is manufactured directly as part of the mesh net and forms the outer edges of the mesh net.

Referring to FIG. 7, a perspective view of the mesh netting 701, integrated flexible cordage 702, and fasteners 703 and 704 is shown. In the above descriptions with reference to FIGS. 5 and 6, the mesh netting itself was assumed mainly inflexible, in that the mesh dimensions are not appreciably altered through stretching when the device is installed on the boat, as would typically be the case with available low cost polypropylene netting. The alternative embodiment shown in FIG. 7 includes provision for a flexible netting 701, with the integrated flexible cordage manufactured directly as part of the netting, and comprising the edge of the netting. The fasteners 703 and 704 are attached to the ends of the integrated flexible cordage at the ends of the net edges. In this embodiment, when the integrated flexible cordage is stretched to be installed on the vessel, the netting would stretch along with the integrated flexible cordage. This embodiment alternative would have the advantage of potentially lower manufacturing costs.

Figure 8:
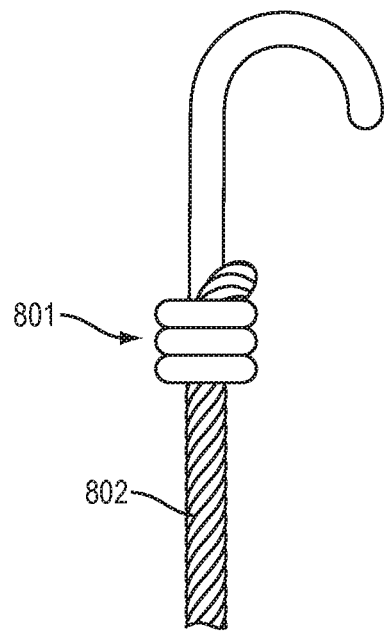
FIG. 8 is a perspective drawing of a representative fastening device assembled to the end of the flexible cordage.

Referring to FIG. 8, a perspective drawing of a representative fastening device 801 assembled to the end of the flexible cordage 802 is shown. The fastening device shown is a commonly available wire fastener typically used with shock cord or bungee cord, with one end in the shape of an open end hook, used for connecting the fastener to a connection point, and the other end wound into a spiral and used for fastening the hook to the shock cord or bungee cord. The fasteners used with the present invention can have various colors as a means of identifying to the user the location relative to the marine vessel or boat at which the fastener should be installed. For example, the color bright red could indicate the fastener should be installed at the starboard (right) forward (front) connection point. The color bright green could indicate the fastener should be installed at the port (left) forward connection point. Other means of identifying the connection point, such as alpha numeric or color coded labels attached to the fasteners, are also anticipated by the present invention. Alternatively, the flexible cordage itself may be color coded to indicate its installation position relative to the marine vessel or boat.

Figure 9:
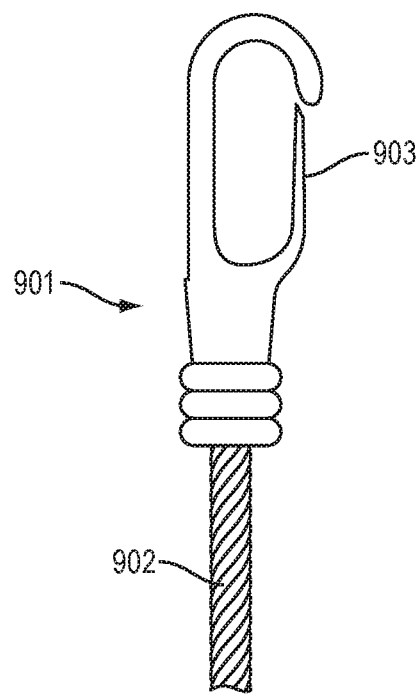
FIG. 9 is a perspective drawing of a second type of representative fastening device assembled to the end of the flexible cordage.

Referring to FIG. 9, a perspective drawing of a representative fastening device 901 assembled to the end of the flexible cordage 902 is shown. The fastening device shown is a commonly available plastic fastener typically used with shock cord or bungee cord, with one end in the shape of a hook and including a 'latch' or 'catch' piece 903 for closing the hook opening when attached. Compared to the faster shown in FIG. 8, this type of fastener has the advantage that the fastener will not 'catch' or become stuck in the netting when the invention is being removed from the vessel or boat, or while the invention is stowed. Both embodiments of the fastener, as shown in FIGS. 8 and 9, are anticipated to be used with the invention depending on the specific application or need. Other types of fasteners are commonly available for use with shock or bungee cord and they are anticipated to be used with the present invention.

Figure 10:
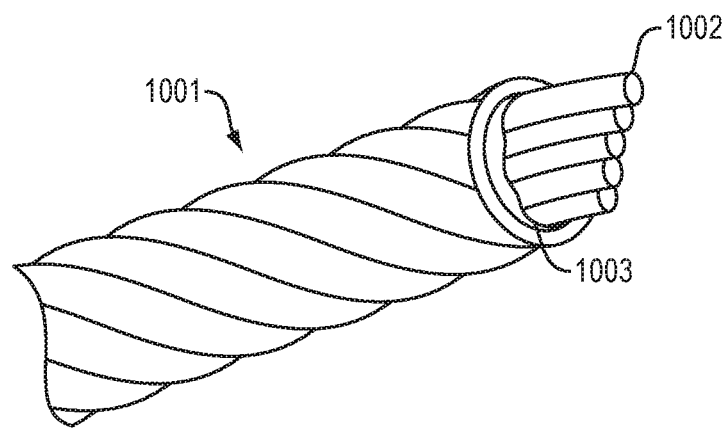
FIG. 10 is an exploded view of the flexible cordage.

Referring to FIG. 10, an exploded view of a representative type of flexible cordage 1001 commonly known as 'shock cord' or 'bungee cord' is shown. This type of cordage typically consists of an interior core of rubber strands 1002 surrounded by a woven textile material 1003. Various qualities and grades of such cord are commonly available and may be used in the specific embodiment depending on factors such as cost, durability, and dimension.

The ability of the cord 1001 to stretch to, for example, up to 100% of its length when not stretched, and to maintain mechanical tension when stretched, is an important factor in the invention since it allows the invention to be installed on marine vessels and boats, and in particular sailboats, with various specific shapes, dimensions, existing components such as stays, running rigging, life-lines, etc. and various potential mounting points. Additionally, the flexibility of the cordage enables tension to be maintained in the mesh net by adjusting the locations of the cordage mounting points on the vessel. Additionally, the flexibility of the cordage enables the net and cordage to 'move' or bounce if a bird attempts to land on either the mesh net or directly on the cordage. Additionally, the cordage may be deployed in various color or color stripe combinations as a means of identifying to the user of the invention the proper mounting point for the end of the cordage section. For example, the section 104 in FIG. 1 could be red to signify that section is the starboard (right) lower section of the invention.

This invention has been disclosed in terms of certain embodiments. It will be apparent that many modifications can be made to the disclosed apparatus without departing from the invention. Therefore, it is the intent of the appended Claims to cover all such variations and modifications as come within true spirit and scope of this invention.

What is claimed is:

1. A bird deterrent device, comprising:
a mesh net for covering a structure;
flexible cordage integrated within said mesh net for supporting said mesh net on said structure and suspending said mesh net above said structure being protected by said device;
fasteners connected to said flexible cordage at predetermined locations for fastening said mesh net to said structure;
a textile or plastic strip connected to said mesh net; and
said textile or plastic strip connected to said flexible cordage by looping said textile or plastic strip around said flexible cordage and connecting said textile or plastic strip to itself.

2. A bird deterrent device, comprising:
a mesh net for covering a structure;
flexible cordage integrated within said mesh net for supporting said mesh net on said structure and suspending said mesh net above said structure being protected by said device;
fasteners connected to said flexible cordage at predetermined locations for fastening said mesh net to said structure; and
said mesh net connected to said flexible cordage by looping said mesh net around said flexible cordage and connecting said mesh net to itself.

3. The bird deterrent device as recited in claim 1 wherein said mesh net connects to said textile plastic strips by at least one of a group of connection techniques including sewing, fusing by melting, mechanical adhesion, gluing, and stapling; and said textile or plastic strip is connected to itself by at least one of a group of connection techniques including sewing, fusing by melting, mechanical adhesion, gluing, and stapling.

4. The bird deterrent device as recited in claim 1 wherein sections of said flexible cordage are coded to indicate an installation orientation of said sections.

5. The bird deterrent device as recited in claim 1 wherein each of said fasteners are coded to indicate an installation orientation of said fasteners.

6. A method of making a bird deterrent device comprising the steps of:
providing a mesh net for covering a structure;
integrating a flexible cordage within said mesh net to enable supporting said mesh on said structure and suspending said mesh net above said structure;
connecting fasteners to said flexible cordage at predetermined locations for fastening said bird deterrent device to said structure;
connecting a textile or plastic strip to said mesh net; and
connecting said textile or plastic strip to said flexible cordage by looping said textile or plastic strip around said flexible cordage and connecting said textile or plastic strip to itself.

7. A method of making a bird deterrent device comprising the steps of:
providing a mesh net for covering a structure;
integrating a flexible cordage within said mesh net to enable supporting said mesh on said structure and suspending said mesh net above said structure;
connecting fasteners to said flexible cordage at predetermined locations for fastening said bird deterrent device to said structure; and
connecting said mesh net to said flexible cordage by looping said mesh net around said flexible cordage and connecting said mesh net to itself.

8. The method as recited in claim 6 wherein said step of integrating said flexible cordage within said mesh net comprises the step of connecting said mesh net to said flexible cordage by connecting a textile or plastic strip to said mesh net by at least one of a group of connection techniques including sewing, fusing by melting, mechanical adhesion, gluing, and stapling; and
connecting said textile or plastic strip to said flexible cordage by looping said textile or plastic strip around said flexible cordage and connecting said textile or plastic strip to itself by at least one of a group of connection techniques including sewing, fusing by melting, mechanical adhesion, gluing, and stapling.

9. The method as recited in claim 6 wherein said step of integrating said flexible cordage within said mesh net comprises the step of coding sections of said flexible cordage to indicate an installation orientation of said flexible cordage.

10. The method as recited in claim 6 wherein said step of connecting fasteners to said flexible cordage comprises the step of coding said fasteners to indicate an installation orientation of said fasteners.

11. The bird deterrent device as recited in claim 2 wherein said mesh net connects to itself by at least one of a group of connection techniques including sewing, fusing by melting, mechanical adhesion, gluing, and stapling.

12. The bird deterrent device as recited in claim 2 wherein sections of said flexible cordage are coded to indicate an installation orientation of said sections.

13. The bird deterrent device as recited in claim 2 wherein each of said fasteners are coded to indicate an installation orientation of said fasteners.

14. The method as recited in claim 7 wherein said step of integrating said flexible cordage within said mesh net comprises the step of connecting said mesh net to said flexible cordage by looping said mesh net around said flexible cordage and connecting said mesh net to itself by at least one of a group of connection techniques including sewing, fusing by melting, mechanical adhesion, gluing, and stapling.

15. The method as recited in claim 7 wherein said step of integrating said flexible cordage within said mesh net comprises the step of coding sections of said flexible cordage to indicate an installation orientation of said flexible cordage.

16. The method as recited in claim 7 wherein said step of connecting fasteners to said flexible cordage comprises the step of coding said fasteners to indicate an installation orientation of said fasteners.

* * * * *